United States Patent
Strassenburg-Kleciak

(10) Patent No.: US 10,295,357 B2
(45) Date of Patent: May 21, 2019

(54) ROUTE GUIDANCE AT INTERSECTIONS

(71) Applicant: Harman Becker Automotive Systems GmbH, Karlsbad (DE)

(72) Inventor: Marek Strassenburg-Kleciak, Garching (DE)

(73) Assignee: HARMAN BECKER AUTOMOTIVE SYSTEMS MGBH, Karlsbad (DE)

( * ) Notice: Subject to any disclaimer, the term of this patent is extended or adjusted under 35 U.S.C. 154(b) by 180 days.

(21) Appl. No.: 14/196,838

(22) Filed: Mar. 4, 2014

(65) Prior Publication Data

US 2014/0249748 A1    Sep. 4, 2014

(30) Foreign Application Priority Data

Mar. 4, 2013   (EP) .................................... 13157563

(51) Int. Cl.
*G01C 21/36* (2006.01)

(52) U.S. Cl.
CPC ..... *G01C 21/3658* (2013.01); *G01C 21/3626* (2013.01)

(58) Field of Classification Search
CPC ........... G01C 21/3626; G01C 21/3614; B60W 2550/402; B60W 50/087
See application file for complete search history.

(56) References Cited

U.S. PATENT DOCUMENTS

| | | | | |
|---|---|---|---|---|
| 8,630,801 | B2 * | 1/2014 | Katzer | G01C 21/3635 340/995.2 |
| 2008/0147305 | A1 * | 6/2008 | Kawamata | B60W 30/146 701/117 |
| 2008/0208450 | A1 | 8/2008 | Katzer | |
| 2011/0276257 | A1 * | 11/2011 | Zaitsu et al. | 701/117 |
| 2012/0245817 | A1 * | 9/2012 | Cooprider | B60W 50/14 701/70 |
| 2013/0345975 | A1 * | 12/2013 | Vulcano | G01C 21/3632 701/533 |
| 2014/0244157 | A1 * | 8/2014 | Tan | G01C 21/3658 701/423 |

FOREIGN PATENT DOCUMENTS

| | | | |
|---|---|---|---|
| EP | 1471329 | A2 | 10/2004 |
| EP | 1536394 | A2 | 1/2005 |
| EP | 2192554 | A1 | 6/2010 |
| EP | 1122626 | A1 | 8/2011 |

* cited by examiner

*Primary Examiner* — Hussein Elchanti
*Assistant Examiner* — Paul A Castro
(74) *Attorney, Agent, or Firm* — Artegis Law Group, LLP

(57) ABSTRACT

Various embodiments relate to techniques of providing route guidance along a planned route leading through at least one intersection. Predetermined attributes for a respective transition through the at least one intersection are retrieved from a database, the attributes specifying at least a curved path modelling a geometrical form of the transition. The curved path is displayed in a map view for route guidance along a planned route.

15 Claims, 9 Drawing Sheets

ROUTE GUIDANCE AT INTERSECTIONS

CROSS-REFERENCE TO RELATED APPLICATIONS

This application claims priority to European Patent Application EP 13 157 563.1, which was filed on Mar. 4, 2013. The aforementioned related patent application is herein incorporated by reference in its entirety.

TECHNICAL FIELD

Various embodiments relate to a method of providing route guidance along a planned route and to a navigation system. In particular, various embodiments relate to techniques which provide the route guidance by displaying in a map view a curved path modelling a geometrical form of a transition leading along a planned route through an intersection.

BACKGROUND OF THE INVENTION

In the art of vehicle navigation, typically a planned route is obtained by performing route finding; once the planned route is obtained, route guidance along the planned route is provided in order to guide a driver of the vehicle from a current position to the destination of the planned route. The route guidance, in other words, is provided to assist the driver in following the planned route by taking appropriate driving actions.

In the context of route guiding, special attention is being paid to turning events, i.e., positions along the planned route where the driver can chose between a plurality of paths to continue. In order to ensure that the driver follows the planned route, it is particularly relevant to provide the route guidance at such turning events. This enables the driver to take the particular driving action which allows to follow the planned route.

A typical turning event is an intersection. An intersection is generally defined as a road junction where two or more roads meet or cross. Typically, at an intersection, the driver of the vehicle has a plurality of driving choices and the route guidance along the planned route supports the driver in taking the particular driving action which follows along the planned route.

A database typically stores map data of a road network which comprises a plurality of road segments. The end points of neighbouring road segments are connected by nodes. A series of road segments may form a road. Sometimes the road network is formally described by means of a road network graph comprising the road segments and the nodes connecting the road segments as edges and vertices. In such a scenario, an intersection may be described as a node associated with more than two road segments. Such a road network graph enables to perform route finding algorithms, e.g., the Dijkstra algorithm and variations thereof, as part of the route finding.

Conventionally, the road network graph is employed not only for the route finding, but additionally for the route guidance: the route guidance along the planned route at an intersection typically includes displaying turning indicators in a map view. Such a turning indicator may include one or more arrows which are arranged along the participating road segments. In such a scenario it may be possible to calculate the turn indicators for the route guidance along the planned route at run-time, e.g., based on the road segments and nodes of the road network graph. There may be no need to store additional data for providing the route guidance, as the route guiding may access the same information that is used for the route finding at an earlier stage.

However, such techniques face certain restrictions. For example, a representation of the intersection in the road network graph may be simplified to a smaller or larger degree. For example, while the representation of the intersection in the road network graph may merely consist of four road segments and a connecting node, the real-world appearance of the intersection may be more sophisticated. For example, a plurality of driving lanes may exist which might have associated turning restrictions. Moreover, the real-world appearance of the intersection may have considerable extensions, i.e., the intersection may cover a significant area. In contrast, when modelling an intersection merely by using road segments and nodes of the road network graph, the intersection may be a point feature. In such a scenario it is not possible, or possible only to a limited degree, to provide route guidance while the vehicle moves through the intersection. The route guidance may be of limited use to the driver of the vehicle. A considerable likelihood of not successfully following the planned route may result. Therefore, a need exists to provide advanced techniques for providing route guidance along a planned route. In particular, a need exists to provide the route guidance along the planned route at intersections in a detailed manner.

SUMMARY

This need is met by the features of the independent claims. The dependent claims define embodiments.

According to an aspect, a method of providing route guidance along a planned route is provided. The method comprises, if the planned route comprises at least one intersection: retrieving from a database predetermined attributes for a transition between an incoming road segment, which leads towards the at least one intersection, and an outgoing road segment, which leads away from the at least one intersection. The attributes specify at least a curved path modelling a geometrical form of the transition. The method further comprises displaying the curved path in a map view for route guidance along the planned route.

The intersection may correspond to a road junction where two or more roads meet or cross. The transition may correspond to a way through the intersection, i.e., represent a topological connection through the at least one intersection, i.e., represent a spatial arrangement of the connection through the intersection. By modelling the geometrical form of the transition by means of the curved path, a real-world appearance of the transition through the intersection may be modelled.

The incoming road segment may in other words be referred to as the entry road segment being positioned on the planned route—e.g., directly—before the at least one intersection. Likewise, the outgoing road segment may be referred to as the exit road segment being positioned along the planned route—e.g., directly—behind the at least one intersection. The curved path may connect the incoming road segment with the outgoing road segment. The data format or structure used to describe the curved path may not be particularly limited, e.g., may be selected from the group comprising: spline, vector curve, Bezier curve, clothoid.

For example, it is possible that in the database a plurality of curved paths are associated with each intersection, such that, depending on the particular planned route, the corresponding attribute may be retrieved which describes the particular transition for the given planned route. For example, in a conventional intersection where two roads cross and no turning-restrictions are in place, there may be four transitions per incoming road possible, corresponding to left turn, right turn, straight ahead, and U-turn; this gives a total number of twelve transitions. For example, for each transition a respective attribute including a curved path may be stored in the database. Depending on the planned route, a particular one may be retrieved, i.e., loaded from the database. In general, it is not necessary to provide attributes for all possible transitions; e.g., it may be sufficient to provide attributes only for comparably complex transitions.

For example, if the at least one intersection comprises a plurality of driving lanes, wherein it is necessary for the driver to pick a particular driving lane in order to follow the planned route, it may be possible to model such a driving-lane specific navigation using techniques as described above. In other words: the curved path may correspond to a particular driving lane of the at least one intersection. A more detailed and precise route guidance for the planned route through the intersection may be provided.

The curved path may model the geometrical form of the transition taking into account a given one of a plurality of driving lanes of the at least one intersection.

By such techniques, a more detailed and comprehensive route guidance may be provided. A likelihood of misguiding may be reduced.

For example, it is possible that the curved path is defined with respect to a first point on the incoming road segment and a second point on the outgoing segment, and at least one further point in-between the incoming road segment and the outgoing road segment. The points may respectively be at a given geolocation and have associated tangents.

For example, the geolocation may be described with respect to latitude and longitude, possibly taking into account an elevation and/or height profile. By specifying the points and the associated tangents, a well-defined curvature of the curved path may be obtained. A data structure comprising points and tangents in order to describe the curvature is sometimes referred to as a clothoid. By using the data structure comprising points and tangents, the curved path may be described with a high spatial resolution; while, at the same time, the amount of data which needs to be stored on the database may be comparably limited. Moreover, the displaying of the curved path in the map view may be comparably feasible using the data structure comprising the points and the tangents. For example, rendering algorithms may readily access and interpret such a data structure.

In other words: the at least one further point, which may be in-between the first and second points, may model the real-world appearance of the transition. While in various reference implementations the at least one intersection may be merely an assembly of one or more zero-dimensional point features, e.g., nodes connecting various road segments in a road network graph, by using the first point, the second point, and the at least one further point it may be possible to model more complex geometrical forms of the transition having at least one-dimensional extensions, or, preferably, at least two-dimensional extensions. It is also possible to consider the elevation and thereby model three-dimensional extensions of the intersection.

It is possible that the at least one intersection connects a plurality of road segments which are stored in the database. The curved path may deviate at least partially from the road segments of the at least one intersection. In other words: it is not necessary that the curved path merely models the geometrical form already provided by the plurality of road segments in the map data stored in the database, e.g., at a higher spatial resolution. Rather, it is possible that distinct geometrical forms are modelled by the curved path—but not, or only to a limited degree, by the plurality of road segments. This is motivated by the provisioning of additional data in the database in form of the attributes including the curved path—in particular, in addition to road network data.

In such a scenario it may be possible that route finding for obtaining the planned route accesses the map data including, e.g., a road network graph which comprises a plurality of road segments—while said route guidance relies additionally on the attributes. In such a manner it may be possible to limit the amount of data which has to be considered by said route finding, while—at the same time—it is possible to provide the route guidance at a high spatial resolution and in a detailed manner. This may enable to, on the one hand side, limit the computational resources which are necessary for performing said route finding; while, nonetheless and at the same time, a detailed route guidance is possible.

The type of attributes retrieved from the database may not be limited to the curved path. For example, the attributes for the transition may further specify intersection features of the at least one intersection with respect to at least one point at a given geolocation along the curved path. For example, the intersection features may be selected from the group comprising: stop line, traffic lights, pedestrian crossing, bicycle crossing, turning restrictions, driving lanes with usage restrictions, e.g., high-occupancy lanes and/or taxi lanes and/or bus lanes and/or restricted operation hours, driving lane markings. The method may further comprise displaying a graphical representation of the intersection features in the map view for route guidance along the planned route.

By retrieving attributes for the transition which further specify the intersection features as discussed above, various effects may be obtained. For example, an ease of recognition of the route guidance may be increased. In other words, it may be easier for the driver to translate the provided route guidance into the real-world situation. For example, by providing the graphical representation of intersection features such as traffic lights, lane markings or pedestrians crossing, it may be easily possible for the driver to identify the real-world counterparts of these graphical representations. Furthermore, by means of the intersection features, it may be possible to create an awareness at the driver for certain potentially dangerous situations. For example, it may be possible to highlight stop lines, traffic lights, and pedestrians crossing such that the driver becomes aware of the particular driving action which needs to be taken at such intersection features.

For example, the planned route may comprise at least two intersections, wherein the incoming road segment leads towards a first one of the at least two intersections and wherein the outgoing road segments leads away from a last one of the at least two intersections.

In such a scenario it may be possible to continuously highlight the given one of the plurality of driving lanes along the curved path throughout the at least two intersections between the incoming and outgoing road segments. In other words, providing the route guidance may not be restricted for individual intersections, i.e., in isolation. Rather, scenarios are known where a complex assembly of multiple intersections exists where the route guidance may be continuously provided throughout the entire assembly of intersections.

For example, the at least two intersections may form an assembly of intersections where a choice of a given driving lane at the first one of the at least two intersections determines an exit point from the assembly of intersections.

For example, in such a scenario, the assembly of intersections may be perceived by a driver of the vehicle as a single, continuous intersection—a formal description of the assembly of intersections consisting of a plurality of individual intersections, e.g., due to the road network graph comprising multiple nodes and road segments, may not be suited well to describe the real-world appearance of the intersection assembly. Therefore, by means of the techniques as discussed above, it may be possible to provide the route guidance mostly independent of the number of successive intersections encountered by the planned route. The curved path may in other words model the geometrical form of the transition independently or largely independently of the respective at least one intersection as defined by the road network graph. This enables to more flexibly handle complex situations as the assembly of intersections as described above.

In various embodiments, the method may further comprise performing route finding in order to obtain a planned route. The route finding may consider weights for road segments and/or nodes of a road network graph. For such road segments and/or nodes which correspond to the at least one intersection, the method may further comprise determining weights depending on the attributes of the transition.

While in various embodiments it is also possible to perform the route finding independently or largely independently of the attributes retrieved from the database which correspond to the transition between the incoming and outgoing road segments, it is also possible that the route finding is performed taking into account these attributes. It may, in particular, be possible that the weights used for said performing of the route finding consider the curved path, e.g., a curvature thereof, a length thereof, an elevation difference thereof, etc. It would also be possible that the weights are determined in dependence of a number of traffic lights and/or stop lines. For example, if the number of traffic lights and/or stop lines is smaller (larger), it may be assumed that the time of travel through the at least one intersection is smaller (larger). Likewise, if the length or curvature of the curved path is larger (smaller) it can be assumed that the time of travel through the at least one intersection is larger (smaller).

The method may further comprise retrieving a current position of a vehicle for which the route guidance is executed. The displaying may be selectively executed if the retrieved current position is within a predefined distance to the at least one intersection. Optionally, a graphical representation of the current position may be displayed in the map view.

For example, in a situation where the current position is close or within the at least one intersection, it may be possible that the route guidance is provided primarily taking into account the retrieved attributes for the particular planned route. For example, curved paths relating to other transitions through the at least one intersection—which might be as well stored in the database—may be not visible in the map view. This may facilitate an ease of recognition of the route guidance.

Further criteria that determine if said displaying is selectively executed may be selected from the group comprising: a magnification scale of the map view being within a predefined range, a velocity of the vehicle being lower than a maximum velocity, a user input.

For example, the current position may be specified with a spatial resolution which is high enough in order to determine a particular driving lane of the at least one intersection on which the vehicle is currently located, e.g., lie in the range of approximately 1 meter or below. As set forth above, the curved path in the map view may correspond to various driving lanes of the at least one intersection. By retrieving the current position, e.g., including an indication of a particular driving lane, deviations from the curved path may be detected and said providing of the route guidance may include providing a respective indication to the driver of the vehicle. In other words, it is possible that, both, said providing of the route guidance, as well as the retrieving of the current position is executed at a comparably high spatial resolution allowing to take into account various driving lanes of the at least one intersection.

For example, in cases where the retrieved attributes further specify intersection features with respect to at least one point, the method may further comprise: issuing a warning to a driver of the vehicle when the turning position approaches the at least one point. In such a scenario it may be possible to create awareness of the driver of potentially dangerous situations corresponding to the various intersection features.

The attributes of the transition may be associated with entries of the database which are selected from the group comprising: a given one of the at least one intersection, the incoming road segment, and the outgoing road segment. For example, in order to retrieve the attributes from the database based on the planned route, it may be feasible to provide pointers at respective entries of the database which are associated with the planned route. Typically, these elements may be the at least one intersection or the participating road segments. Therefore, the particular entry of the database with which the attributes are associated are not particularly limited.

According to a further aspect, a navigation system for providing route guidance along a planned route is provided. The navigation system comprises a database which is configured for storing map data comprising road segments of a road network. The database is further configured for storing predetermined attributes for transitions of intersections of the road segments. The navigation system further comprises at least one processor which is configured for, if the planned route comprises at least one intersection, retrieving from the database predetermined attributes for a transition between an incoming road segment leading towards the at least one intersection and an outgoing road segment leading away from the at least one intersection. The attributes specify at least the curved path modelling a geometrical form of the transition. The navigation system further comprises a display which is configured for selectively displaying the curved path in a map view for route guidance along the planned route.

The navigation system according to the presently discussed aspect may be configured to execute the method of providing route guidance along a planned route according to a further aspect of the present invention.

For such a navigation system effects may be obtained which are comparable to the effects which may be obtained for the method of providing route guidance along a planned route according to a further aspect of the present invention.

It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments.

BRIEF DESCRIPTION OF THE DRAWINGS

The foregoing and additional features and effects of the invention will become apparent from the following detailed description when read in conjunction with the accompanying drawings, in which like reference numerals refer to like elements.

DETAILED DESCRIPTION

Figure 1:
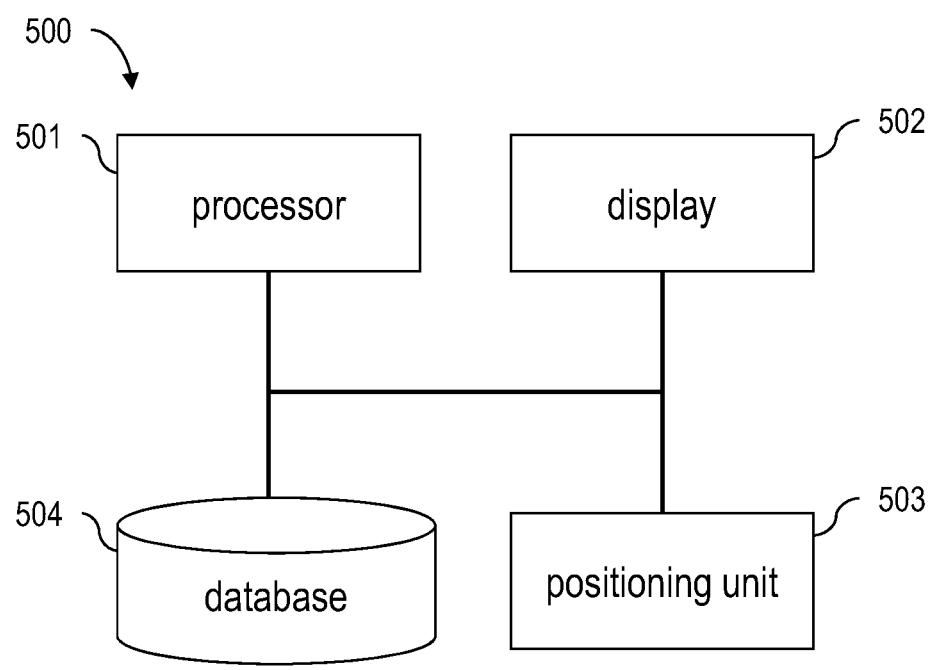
FIG. 1 is a schematic illustration of a navigation system according to various embodiments of the present invention.

In the following, embodiments of the invention will be described in detail with reference to the accompanying drawings. It is to be understood that the following description of the embodiments is not to be taken in a limiting sense. The scope of the invention is not intended to be limited by the embodiments described hereinafter or by the drawings which are taken to be illustrative only.

The drawings are to be regarded as schematic representations, and elements illustrated in the drawings are not necessarily shown to scale. Rather, the various elements are represented such that their function and general purpose become apparent to the person skilled in the art. Any connection or coupling between functional blocks, devices, components or other physical or functional units shown in the drawings or described herein may also be implemented by an indirect connection or coupling. A coupling between components may also be established over a wireless connection. Functional blocks may be implemented in hardware, firmware, software, or a combination thereof.

With respect to the accompanying drawings, hereinafter techniques of providing route guidance along a planned route leading through at least one intersection will be described. Predetermined attributes are retrieved from a database for a transition through the intersection, the attributes including a curved path. The curved path models a geometrical form or shape of the transition, i.e. models the real-world appearance of the transition. For example, the curved path can correspond to a particular driving lane which a driver of the vehicle for which the route guidance is provided needs to take in order to follow the planned route.

In FIG. 1, a navigation system 500 is schematically illustrated. The navigation system 500 comprises a processor 501, e.g., a multi-core processor. The processor 501 is configured for executing a wide variety of tasks, including, but not limited to: providing the route guidance, performing route finding to obtain the planned route, retrieving data from a database 504 of the navigation system 500, and controlling displaying of a map view on a display 502 of the navigation system 500.

For example, the display 502 can be mounted in a center console of the vehicle. It is also possible that display 502 is a head-up display providing the route guidance by projecting onto a windshield of the vehicle.

Furthermore, the navigation system 500 comprises a positioning unit 503. The positioning unit 503 is configured for determining a current position of the vehicle. In particular, the positioning unit 503 can determine the current position such that it indicates or enables to determine a particular driving lane on which the current position is currently located. For example, the positioning unit 503 can comprise a Global Positioning System (GPS) unit. Such a GPS unit may be configured to determine the current position at such a high spatial resolution which enables to deduce the particular driving lane on which the current position of the vehicle is currently located. It is also possible that the positioning unit 503 comprises further entities, e.g., an optical camera which monitors a surrounding of the vehicle and, based on said monitoring, determines the particular driving lane on which the current position of the vehicle is currently located. However, it should be understood that in general the techniques described hereinafter do not necessarily rely on the positioning unit 503 determining the particular driving lane on which the vehicle is currently located. Rather, it may be sufficient to determine the current position at a comparably lower spatial resolution.

Moreover, in general it is not necessary that the positioning unit 503 is part of the navigation system 500. For example, in various reference implementations, the positioning unit 503 is a separate entity which provides the position data specifying the current location to the navigation system 500, e.g., via a vehicle bus system. For this task, the navigation system 500 may comprise a respective interface (not shown in FIG. 1).

Furthermore, the navigation system 500 comprises the database 504. The database 504 stores various data, including, but not limited to: the attributes for the transition through the at least one intersection and map data comprising road segments of a road network graph. In particular, the map data can be accessed and used by the processor 501 in order to perform the route finding. Likewise, the attributes for the transition through the at least one intersection as stored on the database 504 can be used, e.g., together with the map data, by the processor 501 in order to perform the route guidance. For example, the map data stored on the database 504 can comprise pointers or links to the attributes specifying the transition to enable the processor 501 to retrieve the particular attributes which are suited to provide the route guidance for the planned route. Respective techniques of a layered database hierarchy including references between different levels of the database are known to the skilled person, e.g., as part of the Navigation Data Standard (NDS), Version 2.2.1 (2012) of the NDS e.V. consortium. From the NDS, it is also known to separately store in the database 504 such features which are used for said route finding, said route guidance, and said displaying of the map view on the display 502.

Figure 2A:
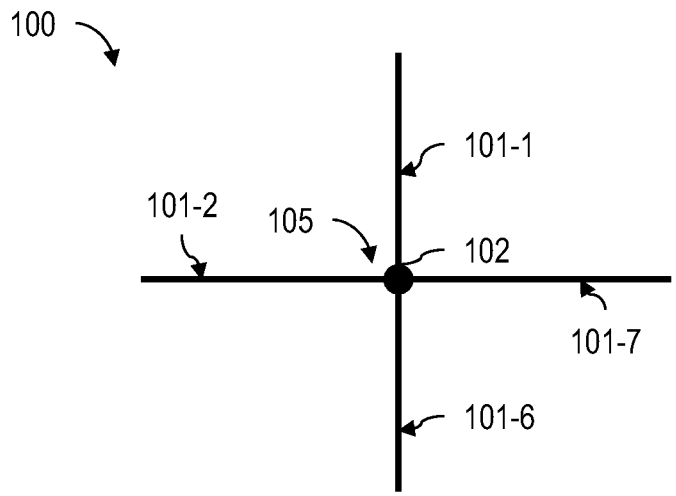
FIG. 2A is an illustration of an intersection formed by four road segments which are connected by a node.

In FIG. 2A, a road network graph 100, e.g., as stored on the database 504 as part of the map data, is illustrated. The road network graph 100 of FIG. 2A comprises four road segments 101-1, 101-2, 101-6, 101-7. These road segments 101-1, 101-2, 101-6, 101-7 share a node 102. In other words, the node 102 connects the road segments 101-1, 101-2, 101-6, 101-7 and therefore forms an intersection 105. As can be seen from FIG. 2A, the intersection 105 is a zero-dimensional point feature. It does not comprise inherently any one-dimensional or two-dimensional or three-dimensional extensions.

Figure 2B:
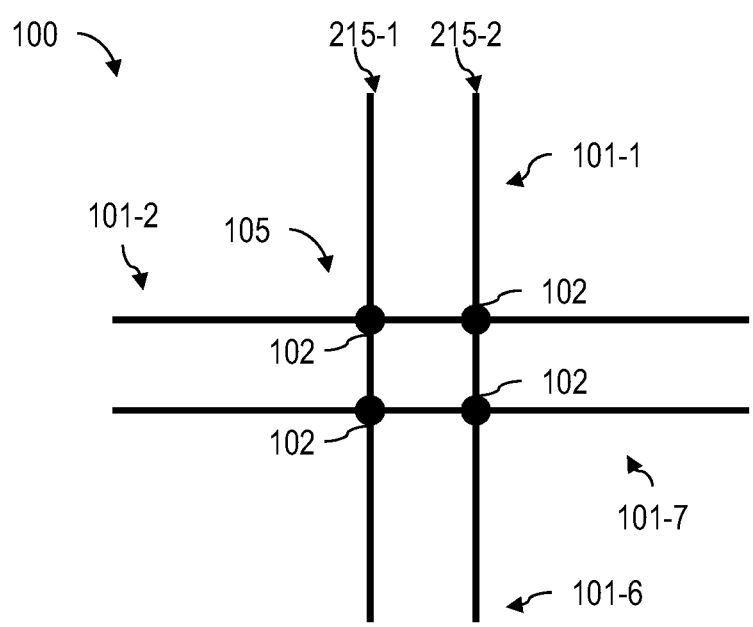
FIG. 2B is an illustration of the intersection of FIG. 2A, where each of the four road segments comprises two driving lanes.

In FIG. 2B, the road network graph 100 of the scenario of FIG. 2A is correspondingly depicted, where the participating road segments 101-1, 101-2, 101-6, 101-7 include two driving lanes 215-1, 215-2, respectively. For example, the two driving lanes 215-1, 215-2 may correspond to the different driving directions.

As can be seen from FIG. 2B, in such a scenario the intersection 105 is formed from four nodes 102 and therefore comprises two-dimensional extensions.

Figure 2C:
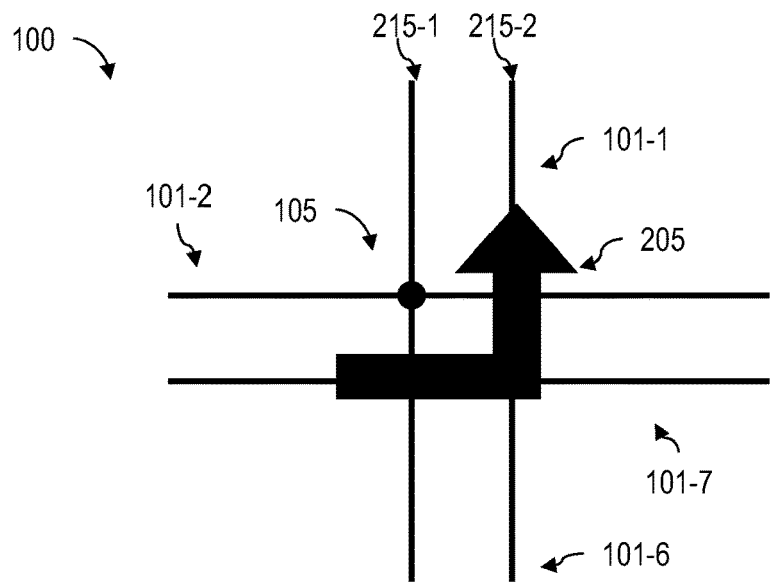
FIG. 2C is an illustration of a reference implementation of route guidance provided for a turning event at the intersection of FIG. 2B.

In FIG. 2C, a scenario is considered where the planned route (not shown in FIG. 2C) leads along the road segments 101-2, 101-1, i.e. includes a left turn at the intersection 105. For this scenario, in FIG. 2C a reference implementation of providing route guidance along a planned route is illustrated. This includes displaying a graphical representation of the road network graph 100 of FIG. 2C as part of a map view; and further includes displaying a turn indicator 205, e.g., in the form of the full arrow as illustrated in FIG. 2C in the map view at the position of the intersection 105. The turn indicator 205 is calculated based on the features as included in the map data stored in the database 504. In particular, the amount of information graphically represented by the turn indicator 205 is therefore limited to the amount of information included in the road network graph 100. This may be in particular relevant in scenarios where the real-world appearance of the intersection 105 is more complex as its representation in the road network graph 100.

Figure 3:
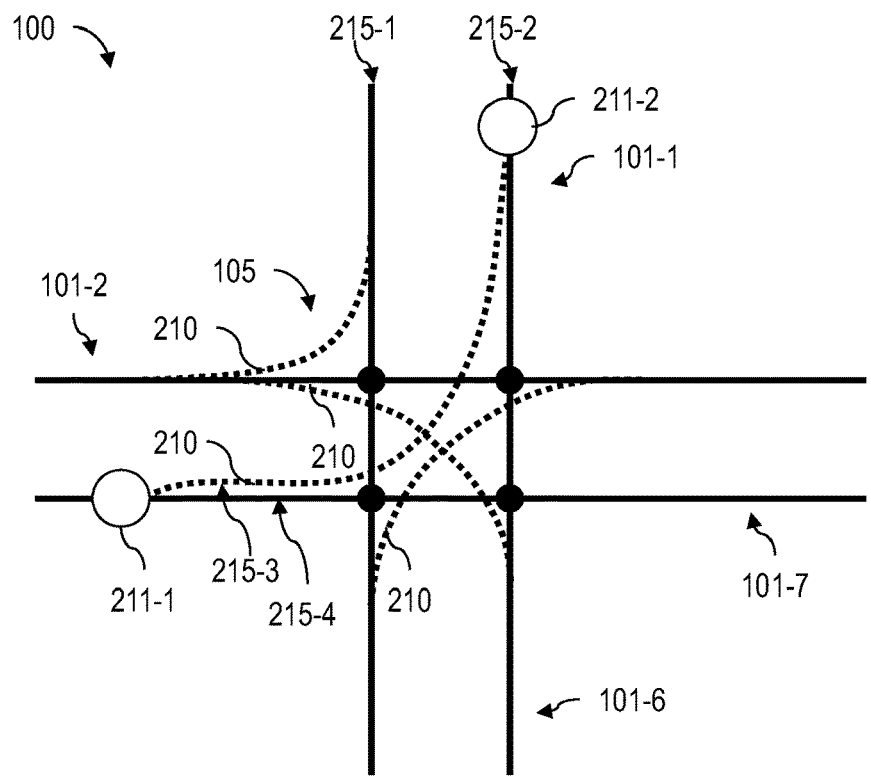
FIG. 3 is an illustration of a curved path modelling the geometrical form of a transition according to various embodiments for the turning event as illustrated at FIG. 2C.

Turning to FIG. 3, techniques for providing the route guidance along a planned route through the intersection 105 according to various embodiments of the present invention are illustrated. In particular, once it is determined that the planned route leads through the intersection 105, attributes are retrieved from database 504, which include a curved path 210 modelling a geometrical form of a transition between the incoming road segment 101-2 and the outgoing road segment 101-1. The curved path 210 is defined with respect to a first point 211-1 on the incoming road segment 101-2 and furthermore with respect to a second point 211-2 on the outgoing road segment 101-1. The first and second points 211-1, 211-2 form an entry point and exit point, respectively, to the curved path 210 for the left turn transition as previously discussed with respect to FIG. 2C.

For sake of completeness, in FIG. 3 curved path 210 for various other transitions leading through the intersection 105 are also depicted. Depending on a particular planned route, one of these various curved paths 210 may be retrieved as part of the attributes stored on the database 504 for performing the route guidance. Only this particular curved path 210 may be selectively displayed in the map view on the display 502 at one time.

As can be seen from FIG. 3, the curved path 210 partially deviates from the road segments 101-1, 101-2, 101-6, 101-7 forming the intersection 105. In other words: the level of detail of the curved path 210 is not limited by the level of detail of the road network graph 100. For example, it is possible to provide further points (not shown in FIG. 3) in-between the entry point 211-1 and the exit point 211-2 and therefore precisely model the geometrical form of the transition, e.g., according to the real-world appearance.

Figure 4:
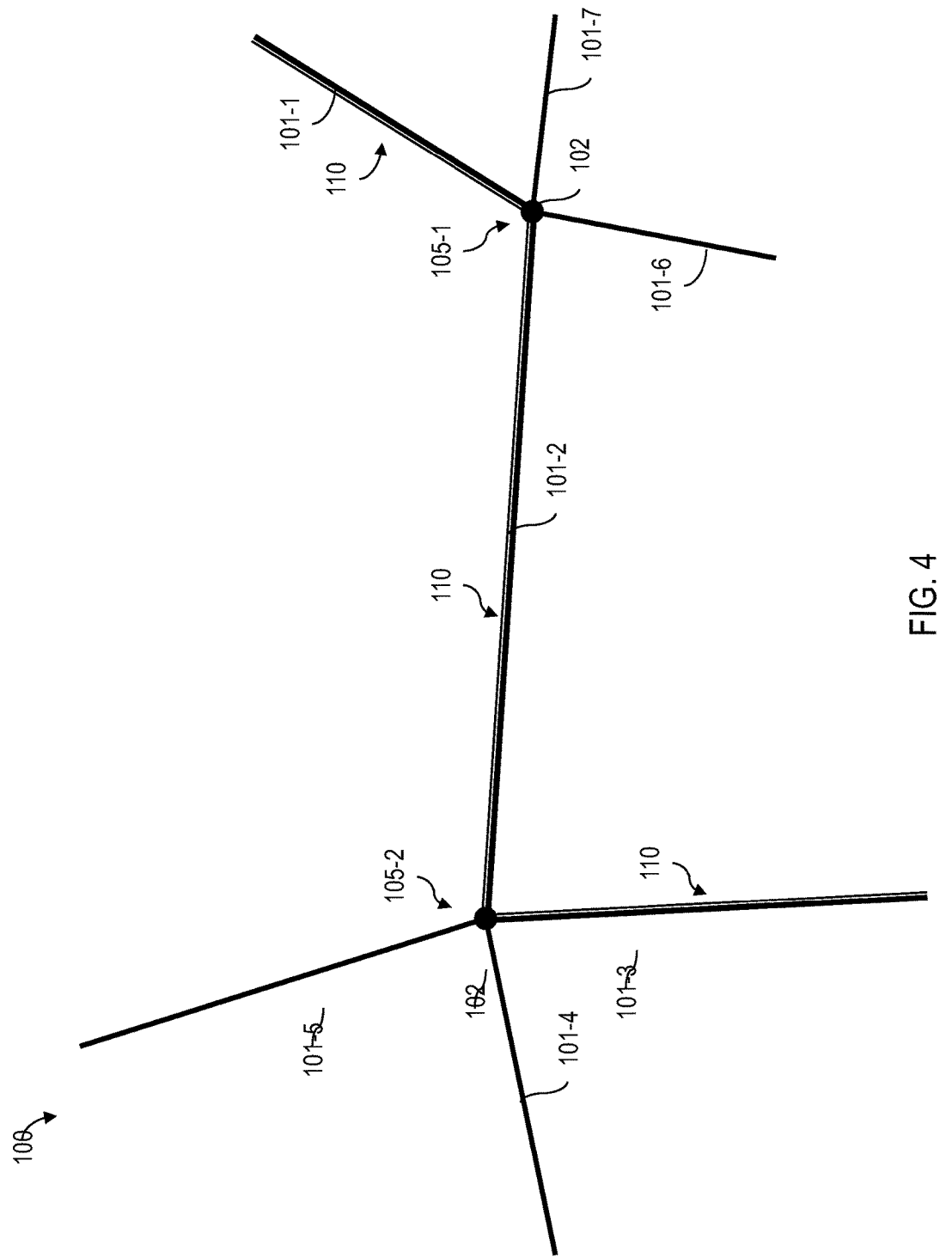
FIG. 4 is an illustration of two intersections.

Turning to FIG. 4, a more complex assembly of two intersections 105-1, 105-2 is illustrated. The two intersections 105-1, 105-2 are formed by two nodes 102. Furthermore, in FIG. 4 the planned route 110 is illustrated using a double line. The planned route 110 enters via the road segment 101-1, follows road segment 101-2 and exits via road segment 101-3.

Figure 5:
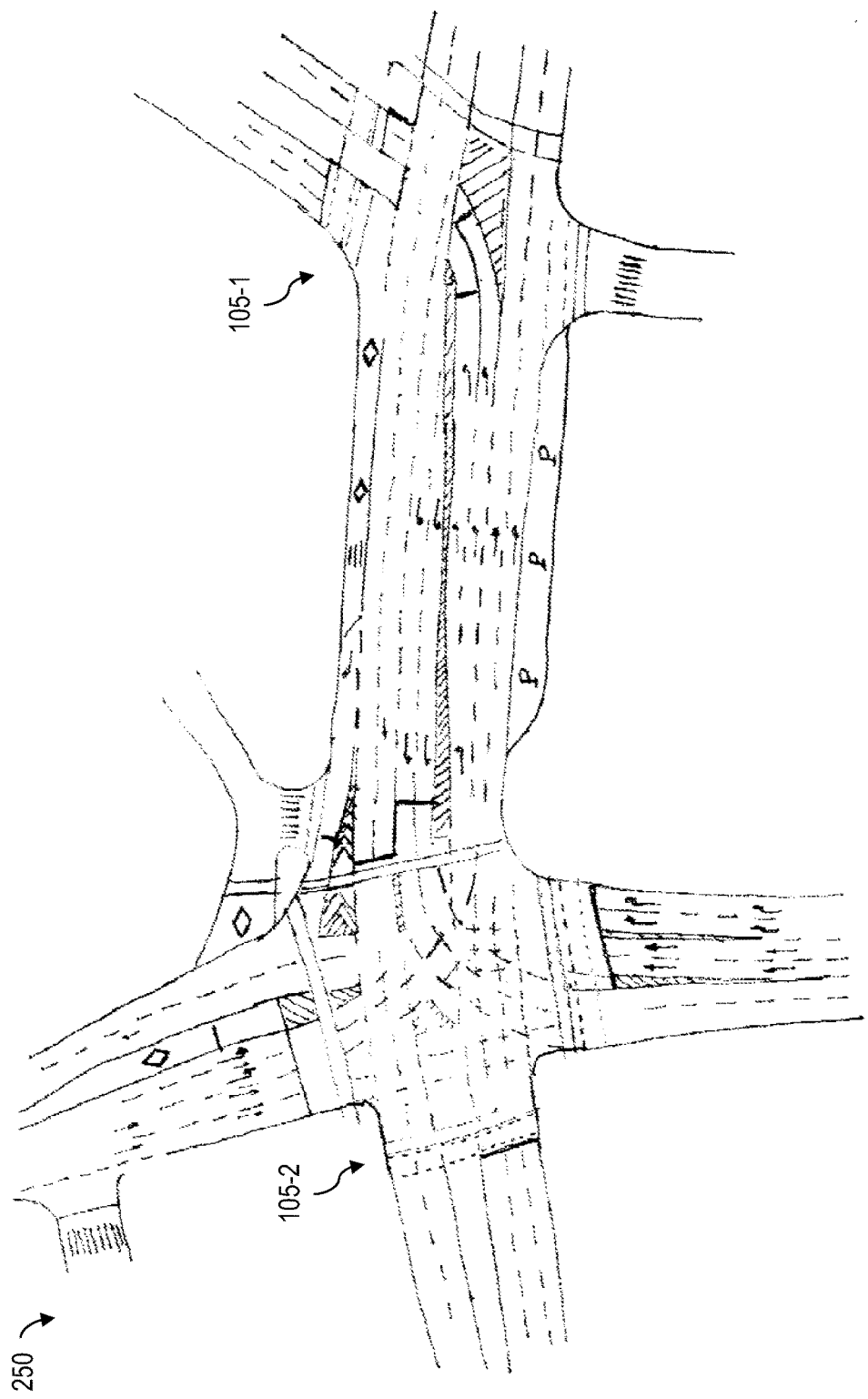
FIG. 5 is a map view of the two intersections of FIG. 4.

In FIG. 5, a real-world appearance of the two intersections 105-1, 105-2 of FIG. 4 is illustrated. For example, such a real-world appearance of the intersections 105-1, 105-2 could be part of the map view 250, e.g., by using respectively textured faces for a rendering of the map view 250. It should be understood that using respective texturing for said displaying of the map view 250 does not necessarily affect the level of detail included in the road network graph 100 of FIG. 4. It may be furthermore not possible or only possible to a limited degree to use such texturing for said route guidance.

As can be seen from FIG. 5, both intersections 105-1, 105-2 comprise multiple driving lanes. In particular, the choice of a given driving lane at the first intersection 105-1 determines an exit point from the second intersection 105-2. In particular: in order to execute the right turn at the first intersection 105-1 and the left turn at the second intersection 105-2 which enables to follow the planned route 110 (cf. FIG. 4), the driver needs to take one of the left driving lanes of the road segment 101-1 leading towards the first intersection 105-1. In other words: the choice of the respective driving lane at the first intersection 105-1 determines whether the driver will be able to successfully follow the planned route 110 at the second intersection 105-2.

Figure 6:
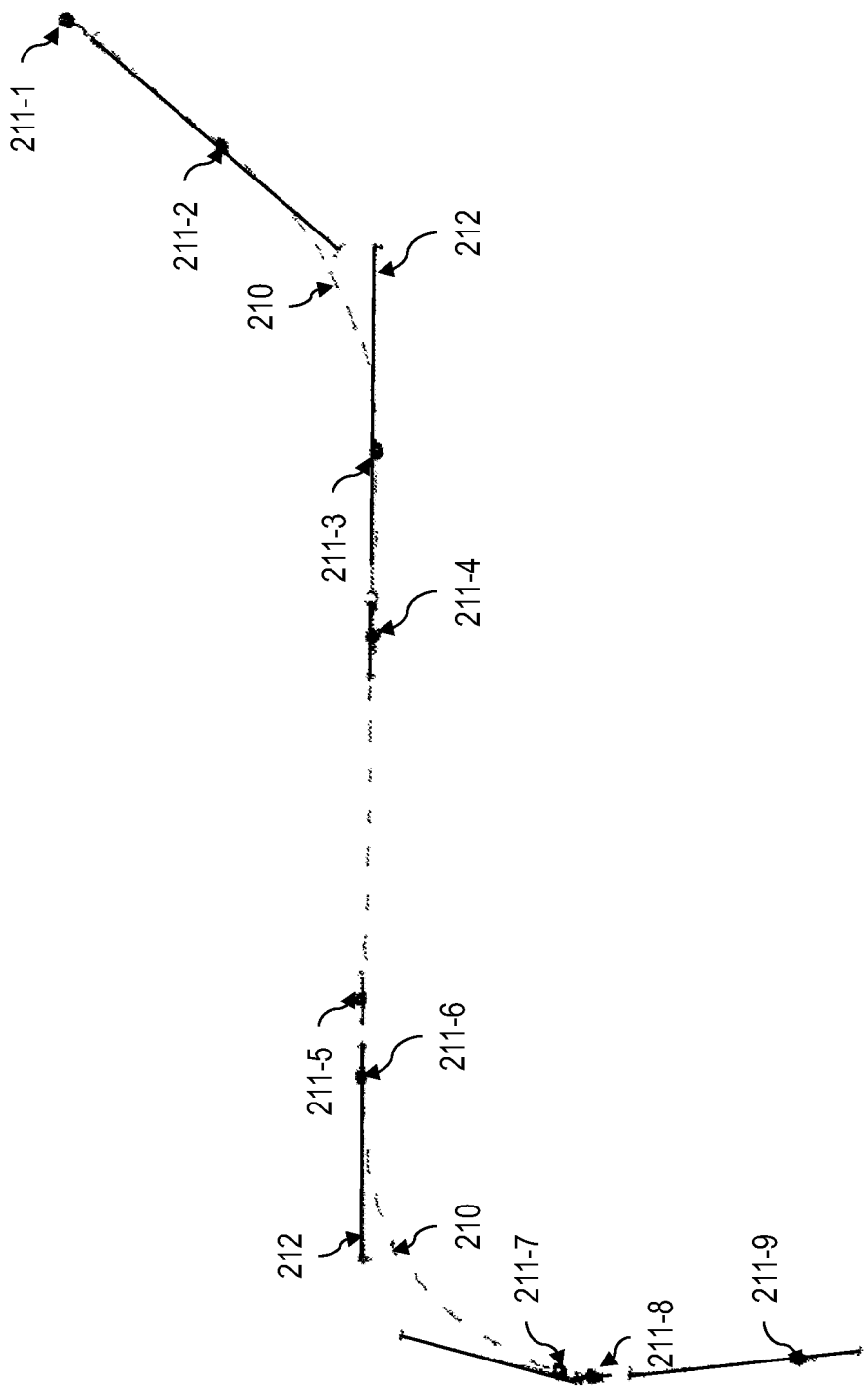
FIG. 6 is an illustration of a curved path modelling a geometrical form of a transition through the two intersections of FIG. 4.

It is not possible or only possible to a limited degree to provide route guidance for such a complex driving manoeuvre by merely using the turn indicators 205 as discussed above with respect to FIG. 2C. Rather, according to various scenarios, the curved path 210 can be retrieved from the database 504, see FIG. 6. As can be seen, the curved path 210 (illustrated in FIG. 6 as a dashed line) is defined with respect to a plurality of points 211-1-211-9, which are respectively at a given geolocation and have associated tangents 212. The tangents 212 define the curvature of the curved path 210. Such a data structure comprising points 211-1-211-9 associated with tangents 212 is sometimes referred to as a clothoid. However, it should be understood that other formal data structures which enable to describe the curved path 210 exist and may be employed in various scenarios.

Figure 7:
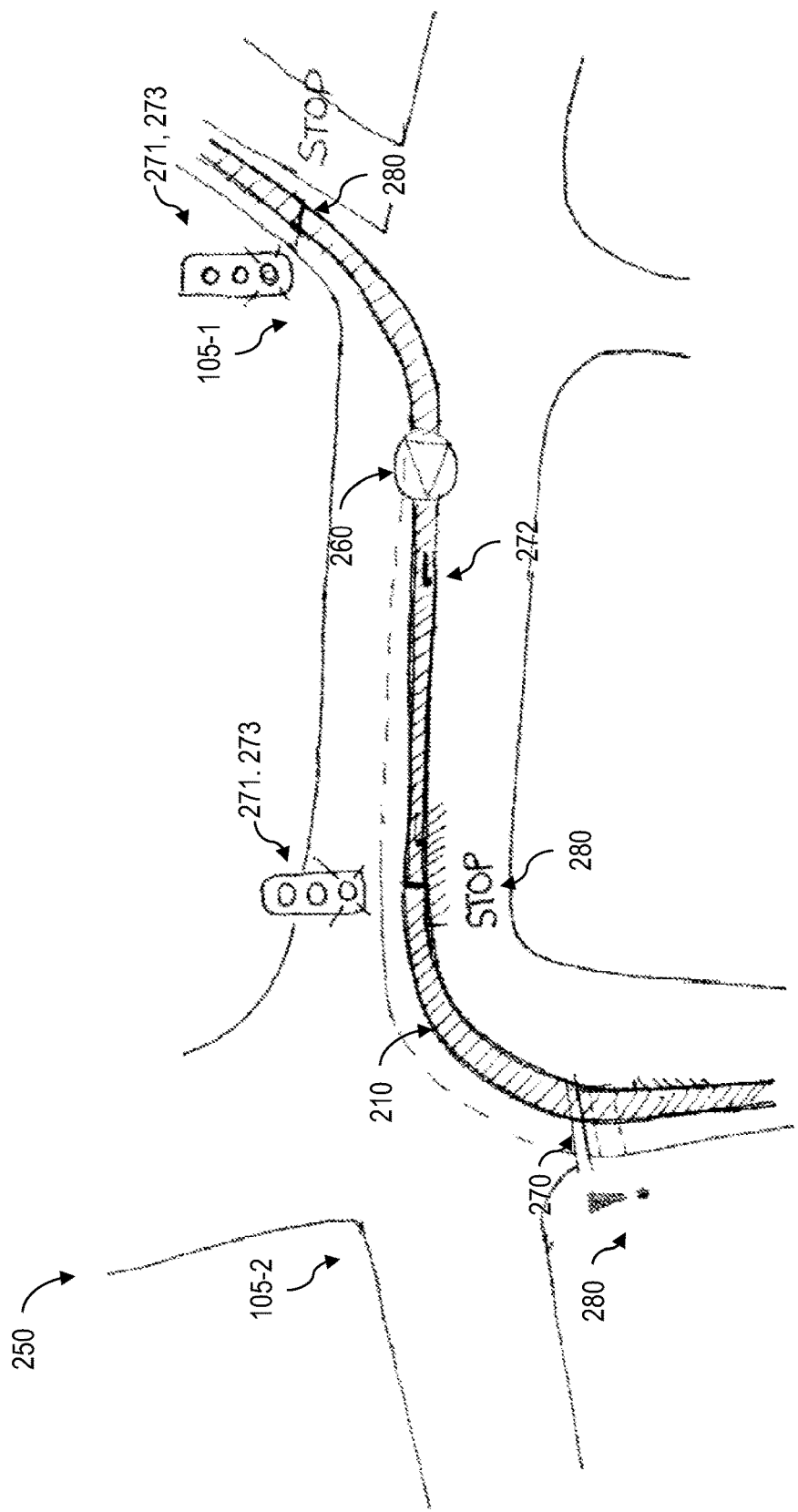
FIG. 7 is a map view displaying the curved path of FIG. 6 for route guidance along the planned route at the two intersections of FIG. 4.

In FIG. 7, the map view 250 including the curved path 210 for route guidance along the planned route 110 is illustrated. As can be seen, e.g., from a comparison of the FIGS. 5 and 7, the curved path 210 models the geometrical form of the transition along the planned route 110, taking into account a given one of the plurality of driving lanes through the intersections 105-1, 105-2. The route guidance includes continuously highlighting this given one of the plurality of driving lanes along the curved path 210 throughout the two intersections 105-1, 105-2 (illustrated in FIG. 7 by the dashed full line). In general, various techniques of highlighting are conceivable, including, but not limited to: using certain colors, using borders, using certain line styles, using certain textures, animation.

Moreover, the current position 260 is graphically indicated in the map view 250. As the current position 260 is determined at a spatial resolution high enough to distinguish between adjacent driving lanes, it is immediately possible for the driver of the vehicle to check whether the vehicle correctly follows the particular driving lane indicated by the curved path 210 and illustrated in the map view 250.

Furthermore, graphical representation of intersection features such as bicycle and pedestrians crossing 270, traffic lights 271, lane markings 272, and stop lines 273 are provided in the map view 250. These graphical representations of the intersection features are supplemented by warnings 280 which create attention of the driver to potentially dangerous situations of the intersection. For example, it is possible to specify the intersection feature with respect to the points 211-1-211-9 which define the curved path 210, see FIG. 6. It is also possible to provide additional, dedicated points to specify the intersection features.

Figure 8:
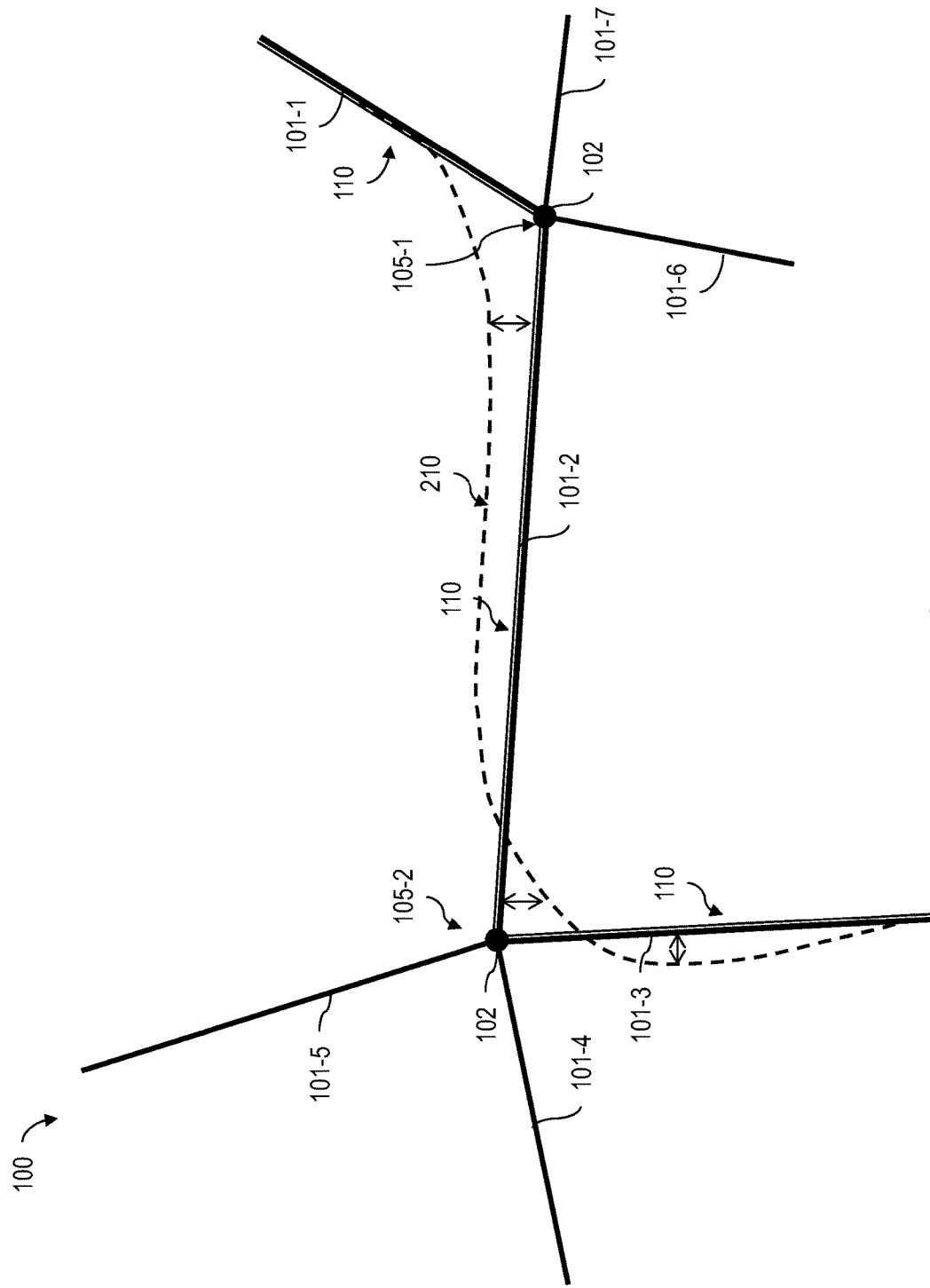
FIG. 8 is a further schematic representation of the curved path of FIG. 6.

In FIG. 8, the curved path 210 is illustrated with respect to the road network graph 100 of FIG. 5. As can be seen, the curved path 210 does not exactly follow the road segments 101-1-101-7 which form the two intersections 105-1, 105-2. Instead, a distance between the various road segments 101-1-101-7 of the road network graph 100 and the curved path 210 may exist (illustrated in FIG. 8 by the arrow).

Figure 9:
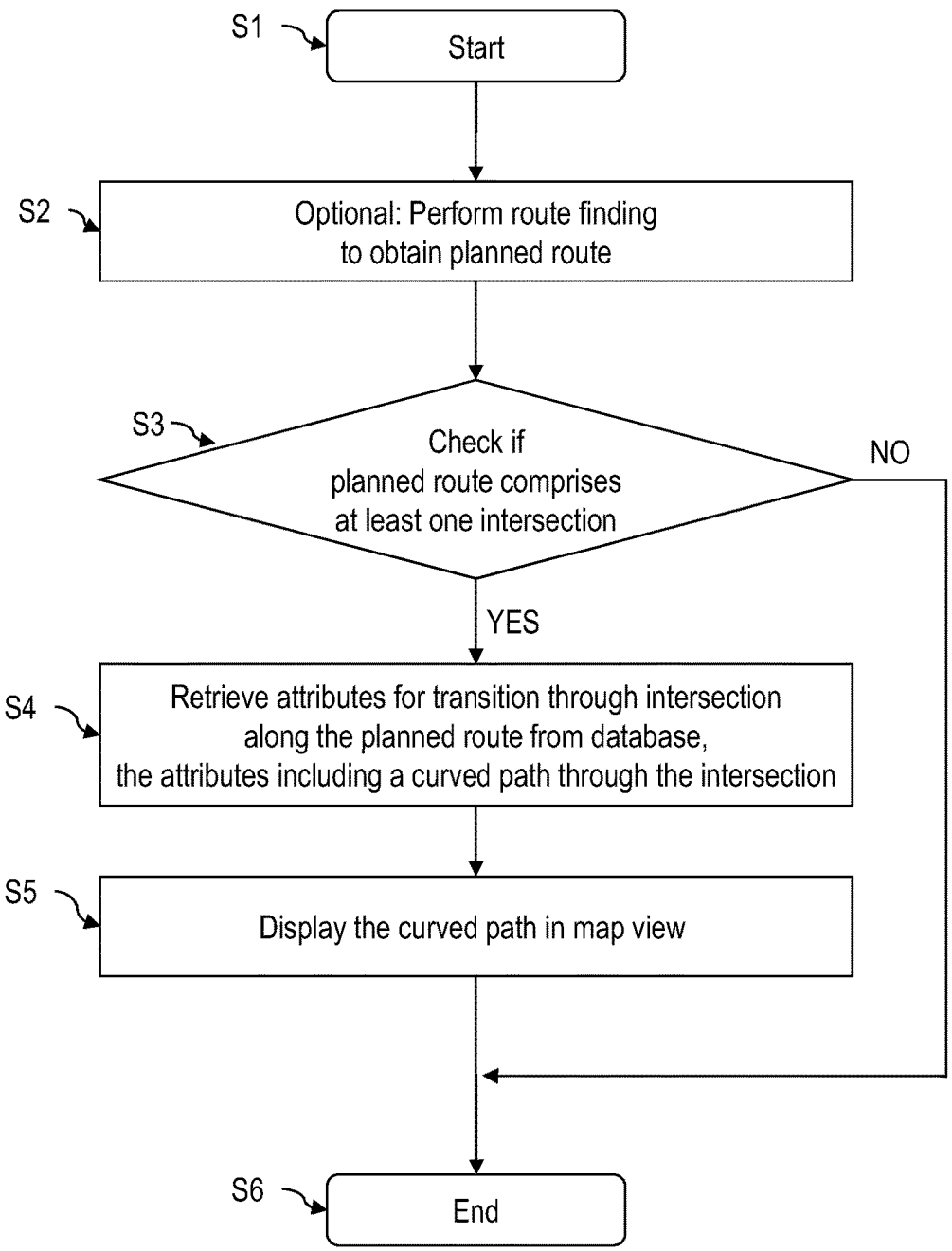
FIG. 9 is a flowchart of a method of providing route guidance along a planned route according to various embodiments of the present invention.

In FIG. 9, a flowchart of a method for providing route guidance along a planned route according to various embodiments of the present invention is illustrated.

The method starts in step S1. In step S2, the route finding is performed to obtain the planned route 110. Step S2 is an optional step. The route finding is executed based on map data comprising a road network graph 100 as stored in the database 504. Alternatively, it is possible to obtain the planned route 110 from other entities.

In step S3, it is checked whether the planned route comprises ant least one intersection 105, 105-1, 105-2. If this is not the case, the method ends in step S6.

Otherwise, attributes for a transition through the at least one intersection 105, 105-1, 105-2 along the planned route 110 are retrieved from the database 504. The attributes include at least the curved path 210 through the at least one intersection 105, 105-1, 105-2. Furthermore, the attributes may include the intersection features, e.g., geographical position of stop lines, traffic lights, etc.

In step S5, the curved path 210 is displayed in the map view 250. Optionally, the current position 260 can be displayed in the map view such that the driver may easily determine whether the vehicle follows the curved path 210.

The method ends in step S6.

Although the invention has been shown and described with respect to certain preferred embodiments, equivalents and modifications will occur to others skilled in the art upon reading and understanding of the specification. The present invention includes also equivalents and modifications and is limited only by the scope of the appended claims.

For example, various embodiments of the map view have been discussed making reference to two-dimensional map views. Yet it is possible to apply techniques described herein to three-dimensional map views.

The invention claimed is:

1. A method of providing route guidance along a planned route by means of a navigation system, the method comprising:
upon determining that the planned route along a plurality of road segments of a road network graph comprises at least two adjacent intersections, retrieving from a database predetermined attributes for a transition between an incoming road segment of the plurality of road segments and leading towards a first one of the at least two adjacent intersections and an outgoing road segment of the plurality of road segments and leading away from a last one of the at least two adjacent intersections, wherein:
the predetermined attributes specify at least a curved path modelling a geometrical form of the transition,
the curved path is defined from the incoming road segment leading toward the first one of the at least two adjacent intersections and the outgoing road segment leading away from the last one of the at least two adjacent intersections,
the curved path is defined with respect to a first point on the incoming road segment, a second point on the outgoing road segment, and at least one further point in-between the incoming road segment and the outgoing road segment,
the respective points are at given geolocations and have associated tangents to the curved path thereby defining a curvature of the curved path, and
the curved path is distinct from the plurality of road segments and at least partially deviates from the plurality of road segments; and
controlling a display to display the curved path in a map view for route guidance along the planned route.

2. The method of claim 1,
wherein the predetermined attributes for the transition further specify intersection features of the at least two adjacent intersections with respect to at least one point at a given geolocation along the curved path, the intersection features being selected from the group comprising:
stop line;
traffic lights;
pedestrian crossing;
bicycle crossing;
turning restrictions;
driving lane markings; and
driving lanes with usage restriction; and
wherein the method further comprises controlling the display to display a graphical representation of the intersection features in the map view for route guidance along the planned route.

3. The method of claim 1, wherein the curved path models the geometrical form of the transition taking into account a given one of a plurality of driving lanes of the at least two adjacent intersections.

4. The method of claim 3, wherein controlling the display includes continuously highlighting the given one of the plurality of driving lanes along the curved path throughout the at least two adjacent intersections between the incoming and outgoing road segments.

5. The method of claim 1, wherein the at least two adjacent intersections form an assembly of intersections where a choice of a given driving lane at the first one of the at least two adjacent intersections determines an exit point from the assembly of intersections.

6. The method of claim 1, further comprising:
performing route finding to obtain the planned route, the route finding considering weights for at least one of road segments and nodes of a road network graph; and
for the at least one of road segments and nodes which correspond to the at least two adjacent intersections, determining the weights depending on the predetermined attributes of the transition.

7. The method of claim 1, further comprising:
retrieving a current position of a vehicle for which the route guidance is executed, wherein said displaying is selectively executed if the retrieved current position is within a predefined distance to said at least one intersection.

8. The method of claim 7, wherein a graphical representation of the current position is displayed in the map view.

9. The method of claim 7,
wherein the predetermined attributes for the transition further specify intersection features of the at least two adjacent intersections with respect to at least one point at a given geolocation along the curved path, the intersection features being selected from the group comprising:
stop line;
traffic lights;
pedestrian crossing;
bicycle crossing;
turning restrictions;
driving lane markings; and
driving lanes with usage restriction; and
further comprising selectively issuing a warning to a driver of the vehicle, if the current position approaches the at least one point.

10. The method of claim 1,
wherein the predetermined attributes of the transition are associated with entries of the database which are selected from the group comprising:
a given one of the at least two adjacent intersections;
the incoming road segment; and
the outgoing road segment.

11. A navigation system for providing route guidance along a planned route, the navigation system comprising:
a database configured for storing map data comprising road segments of a road network graph and further configured for storing predetermined attributes for transitions of intersections of the road segments;
at least one processor which is configured for, upon determining that the planned route along a plurality of road segments of the road network graph comprises at least two adjacent intersections, retrieving from the database predetermined attributes for a transition between an incoming road segment of the plurality of road segments and leading toward a first one of the at least two adjacent intersections and an outgoing road segment of the plurality of road segments and leading away from a last one of the at least two adjacent intersections, wherein:
the predetermined attributes specify at least a curved path modelling a geometrical form of the transition, the curved path is defined from the incoming road segment leading toward the first one of the at least two adjacent intersections and the outgoing road segment leading away from the last one of the at least two adjacent intersections, the curved path is defined with respect to a first point on the incoming road segment, a second point on the outgoing road segment, and at least one further point in-between the incoming road segment and the outgoing road segment,
the respective points are at given geolocations and have associated tangents to the curved path thereby defining a curvature of the curved path,
and the curved path is distinct from the plurality of road segments and at least partially deviates from the plurality of road segments; and a display configured for selectively displaying the curved path in a map view for route guidance along the planned route.

12. A navigation system for providing route guidance along a planned route, the navigation system comprising:
a database configured to store map data comprising road segments of a road network and further configured to store predetermined attributes for transitions of intersections of the road segments;
at least one processor configured to retrieve from the database predetermined attributes for a transition of at least two adjacent intersections along the planned route that includes a plurality of road segments of the road network graph, wherein:
the predetermined attributes comprise at least one attribute for a transition between an incoming road segment of the plurality of road segments and leading toward a first one of the at least two adjacent intersections and an outgoing road segment of the plurality of road segments and leading away from a last one of the at least two adjacent intersections,
the predetermined attributes specify at least a curved path modelling a geometrical form of the transition,
the curved path is defined from the incoming road segment leading toward the first one of the at least two adjacent intersections and the outgoing road segment leading away from the last one of the at least two adjacent intersections,
the curved path is defined by a first point on the incoming road segment, a second point on the outgoing road segment, and a third point arranged between the incoming road segment and the outgoing road segment,
the respective points are at given geolocations and have associated tangents to the curved path thereby defining a curvature of the curved path, and
the curved path is distinct from the plurality of road segments and at least partially deviates from the plurality of road segments; and
a display configured to display the curved path for route guidance.

13. The navigation system of claim 12, wherein the predetermined attributes for the transition further specify at least one feature of the at least two adjacent intersections, wherein the at least one feature comprises at least one of:
a stop line;
a traffic light;
a pedestrian crossing;
a bicycle crossing;
a turning restriction;
a driving lane marking; and
a driving lane with a usage restriction; and
wherein the display is further configured to display a graphical representation of the at least one feature of the at least two adjacent intersections.

14. The navigation system of claim 12, wherein the curved path models the geometrical form of the transition taking into account a given one of a plurality of driving lanes of the at least two adjacent intersections.

15. The navigation system of claim 12, further comprising a positioning unit configured to determine a current position; and
wherein the display is configured to display the current position.

* * * * *

UNITED STATES PATENT AND TRADEMARK OFFICE
CERTIFICATE OF CORRECTION

PATENT NO. : 10,295,357 B2
APPLICATION NO. : 14/196838
DATED : May 21, 2019
INVENTOR(S) : Strassenburg-Kleciak It is certified that error appears in the above-identified patent and that said Letters Patent is hereby corrected as shown below:

On the Title Page

Item [73], delete "HARMAN BECKER AUTOMOTIVE SYSTEMS MGBH" and insert --HARMAN BECKER AUTOMOTIVE SYSTEMS GMBH--.

Signed and Sealed this
Thirteenth Day of August, 2019

Andrei Iancu
*Director of the United States Patent and Trademark Office*